(12) United States Patent
Pfeifer et al.

(10) Patent No.: US 10,888,833 B2
(45) Date of Patent: Jan. 12, 2021

(54) REACTOR FOR PRODUCING SYNTHESIS GAS

(71) Applicant: KARLSRUHER INSTITUT FUER TECHNOLOGIE, Karlsruhe (DE)

(72) Inventors: Peter Pfeifer, Linkenheim (DE); Paolo Piermartini, Karlsruhe (DE); Tim Boeltken, Karlsruhe (DE); Robin Duerrschnabel, Rastatt (DE)

(73) Assignee: KARLSRUHER INSTITUT FUER TECHNOLOGIE, Karlsruhe (DE)

( * ) Notice: Subject to any disclaimer, the term of this patent is extended or adjusted under 35 U.S.C. 154(b) by 208 days.

(21) Appl. No.: 16/086,651

(22) PCT Filed: Mar. 21, 2017

(86) PCT No.: PCT/EP2017/056715
§ 371 (c)(1),
(2) Date: Sep. 20, 2018

(87) PCT Pub. No.: WO2017/162681
PCT Pub. Date: Sep. 28, 2017

(65) Prior Publication Data
US 2019/0111407 A1   Apr. 18, 2019

(30) Foreign Application Priority Data

Mar. 23, 2016   (DE) .................. 10 2016 105 492

(51) Int. Cl.
*B01J 19/24* (2006.01)
*C01B 3/32* (2006.01)
(Continued)

(52) U.S. Cl.
CPC ......... *B01J 19/2485* (2013.01); *B01J 8/0278* (2013.01); *B01J 23/40* (2013.01);
(Continued)

(58) Field of Classification Search
CPC combination set(s) only.
See application file for complete search history.

(56) References Cited

U.S. PATENT DOCUMENTS

| | | |
|---|---|---|
| 6,139,810 A | 10/2000 | Gottzmann et al. |
| 6,267,912 B1 | 7/2001 | Hershkowitz et al. |

(Continued)

FOREIGN PATENT DOCUMENTS

| | | |
|---|---|---|
| AU | 7143498 A | 11/1998 |
| DE | 10114173 A1 | 12/2001 |

(Continued)

*Primary Examiner* — Kaity V Chandler
(74) *Attorney, Agent, or Firm* — Abel Schillinger, LLP

(57) ABSTRACT

The present invention relates to a reactor for producing synthesis gas which has a fluid-tight connection to a heat exchanger, and to a process for producing synthesis gas, preferably under high pressure, by using the reactor. The reactor comprises a mixer, a mixing space, a reactor space, separate inlets for at least two fluid reactants and an outlet for at least one fluid product, and a reactor shell surrounding these, and wherein the mixer comprises a mixer base, at least one mixer disk with channels for a first fluid, at least one mixer disk with channels for a second fluid, a mixer closure, and a mixer lid.

19 Claims, 4 Drawing Sheets

(51) Int. Cl.
  *C01B 3/38* (2006.01)
  *B01J 8/02* (2006.01)
  *B01J 23/40* (2006.01)
  *B01J 35/04* (2006.01)
  *B01J 35/00* (2006.01)

(52) U.S. Cl.
  CPC .............. *C01B 3/323* (2013.01); *C01B 3/382* (2013.01); *B01J 35/0006* (2013.01); *B01J 35/0046* (2013.01); *B01J 35/04* (2013.01); *B01J 2208/00495* (2013.01); *B01J 2219/1923* (2013.01); *B01J 2219/1942* (2013.01); *B01J 2219/1948* (2013.01); *B01J 2219/2411* (2013.01); *B01J 2219/2432* (2013.01); *B01J 2219/2441* (2013.01); *B01J 2219/2443* (2013.01); *B01J 2219/2446* (2013.01); *C01B 2203/0244* (2013.01); *C01B 2203/062* (2013.01); *C01B 2203/1217* (2013.01); *C01B 2203/1241* (2013.01); *C01B 2203/1247* (2013.01); *Y02P 20/52* (2015.11)

(56) References Cited

U.S. PATENT DOCUMENTS

| | | |
|---|---|---|
| 6,936,238 B2 | 8/2005 | Sennoun et al. |
| 7,226,547 B2 | 6/2007 | Hampden-Smith et al. |
| 7,261,751 B2 | 8/2007 | Dutta et al. |
| 7,608,120 B2 | 10/2009 | Wunning |
| 7,829,039 B2 | 11/2010 | Schubert et al. |
| 2004/0047800 A1 | 3/2004 | Sennoun et al. |
| 2004/0075084 A1 | 4/2004 | Kramer et al. |
| 2004/0213083 A1 | 10/2004 | Fujiwara et al. |
| 2004/0229752 A1 | 11/2004 | Long et al. |
| 2007/0006529 A1 | 1/2007 | Wunning |
| 2007/0261686 A1 | 11/2007 | Montel |
| 2008/0093583 A1* | 4/2008 | van den Oosterkamp ................ B01J 8/025 252/373 |
| 2008/0140261 A1 | 6/2008 | Hansen et al. |
| 2008/0165616 A1 | 7/2008 | Schubert et al. |
| 2009/0292030 A1 | 11/2009 | Casey et al. |
| 2013/0015405 A1 | 1/2013 | Quintero et al. |
| 2013/0129610 A1 | 5/2013 | Kale |
| 2014/0171709 A1* | 6/2014 | Olbert ...................... C07C 5/48 585/443 |

FOREIGN PATENT DOCUMENTS

| | | |
|---|---|---|
| DE | 10338240 A1 | 3/2004 |
| EP | 0312757 A1 | 4/1989 |
| EP | 0962422 A1 | 12/1999 |
| EP | 1473077 A2 | 11/2004 |
| EP | 1674152 A2 | 6/2006 |
| EP | 1866066 A1 | 12/2007 |
| JP | 2002-292274 A | 10/2002 |
| WO | 9849095 A1 | 11/1998 |
| WO | 0247805 A2 | 6/2002 |
| WO | 2005084771 A1 | 9/2005 |
| WO | 2006032644 A1 | 3/2006 |
| WO | 2006105870 A1 | 10/2006 |
| WO | 2011083333 A1 | 7/2011 |
| WO | 2011121433 A1 | 10/2011 |

\* cited by examiner

REACTOR FOR PRODUCING SYNTHESIS GAS

BACKGROUND OF THE INVENTION

1. Field of the Invention

The present invention relates to a reactor for the production of synthesis gas that optionally has a fluid-tight connection to a heat exchanger, and to a process for producing synthesis gas, preferably under high pressure.

2. Discussion of Background Information

Reactors and processes for production of synthesis gas, which are often defined in the prior art as a mixture of hydrogen and carbon monoxide, are known from US 2004/0229752 A1 (corresponding to U.S. Pat. No. 7,226,547), EP 0 962 422 A1, DE 101 14 173 A1, WO 2011/083333A1 and WO 98/49095 (corresponding to AU 7143498 A) and U.S. Pat. No. 7,261,751 B2.

Catalytic partial oxidation is often used in the production of synthesis gas. A process of this kind is known from WO 02/47805 A2 and from WO 2006/032644 A1.

Further reactors and especially microscale mixers are known from WO 2006/105870 A1 (corresponding to EP 1 866 066 A) and EP 1 674 152 A2. DE 103 38 240 A1 discloses a partial oxidation steam reactor for reforming a hydrocarbon fuel stream to a reformate stream comprising hydrogen. Reactors containing mixers with different inlets and the different arrangement thereof are known from US 2008/0140261 A1, JP 2002-292274 A and EP 1 473 077 A2. However, there is no disclosure of a reversal of flow of a reactant prior to mixing with the second reactant in the mixing space, or of a reactor having countercurrent construction.

A problem that from the prior art of known reactors occurs is thermomechanical stress. This is especially thermomechanical loading or thermomechanical fatigue on the materials used owing to changes in temperature, especially as a result of the occurrence of gradients in thermal stress.

Since many materials, in the event of a change in temperature, can also undergo changes in their thermomechanical properties, it is possible for thermal expansion, softening, fiber conversion or sintering stages, for example, to occur. These are examined, for example, by means of thermomechanical analysis in which the changing dimensions of materials is determined as a function of temperature and/or time under defined mechanical stresses, for example according to DIN 51005, ASTM E 831, ASTM D 696, ASTD D 3386 and ISO 11359.

As well as thermomechanical stress, problems can also occur in the control and assurance of an optimal ratio of hydrogen to carbon monoxide in the product gas. Moreover, there can also be coke formation, which constitutes a risk of blockage. In order to assure safe operation, in addition, a homogeneous reaction between O2 and fuel should be avoided. This leads to a risk of explosion.

A further problem that occurs in many reactors known to date is difficult and hence costly and inconvenient maintenance. More particularly, the accessibility of individual elements and components of the reactors for repair or for exchange is found to be difficult. This usually occurs when there is no reversal of flow in the reactor.

In processes in which gaseous reactants are converted to products comprising liquid components, according to prior art, either homogeneous partial oxidation or catalytic reforming with heating by burner systems or a combination of these two methods should be employed. However, the methods known to date require a large amount of space in a specific manner for the production output and are therefore unsuitable for use in mobile container- or skid-based systems.

An alternative proposed is catalytic partial oxidation for process intensification. However, this method is difficult to control from a safety point of view in the known designs—for example a tubular reactor or a monolithic reactor system—since homogeneous reactions and/or excessively high temperatures can occur at the catalyst. This can lead to component failure, especially if the synthesis gas is to be generated under pressure. Reactants used are, for example, methane, natural gas or associated petroleum gas (with further higher hydrocarbon constituents) or renewable gases, for example biogas.

Compression of these reactants is achievable in a less costly and technically simpler manner. However, coke can also form at the relatively high pressure used. This is aggravated by some concepts for temperature control.

In order to achieve the reaction temperature, in many designs, the heat in the off gas also has to be recycled completely. In catalytic partial oxidation (CPOX for short), thermal management of gas entry, i.e. the control and adjustment of the gaseous reactants, is of great significance in order to avoid any exceedance of explosion spikes and/or temperature spikes in the event of a change in throughput.

It was an object of the present invention to provide a reactor and a process for preparation of synthesis gas, in which the disadvantages of the prior art no longer occur.

The reactor is to enable easy handling and assembly; maintenance and exchange of individual components is to be executable in a rapid and simple manner.

More particularly, the preparation and/or further use of synthesis gas for the production of fuels or chemicals under high pressure is to be assured. In addition, the reactor and the process are to enable process intensification, i.e. an increase in effectiveness and/or yield, of the synthesis gas production, especially by a catalytic partial oxidation. Both the reactor and the process, independently and/or in combination, are to avoid the safety problems, especially in the partial oxidation by gas phase reaction, and/or temperature spikes at the catalyst. These safety problems can lead to destruction of the mode of function of the reactor and to a poor yield. Synergistic effects resulting from the reactor in combination with the production process are particularly advantageous, i.e. those resulting from construction and process technology measures.

SUMMARY OF THE INVENTION

This object is achieved by a reactor for production of synthesis gas having a mixer, mixing space, reactor space, inlets for at least two fluid reactants and outlet for at least one fluid product, and a reactor shell encompassing these, comprising an outer fluid-tight inlet for at least one reactant between the reactor shell and mixer in the interior of the reactor, within which there is disposed at least one fluid-tight inlet for a further reactant.

Both the reactor and the individual components are assembled from materials and in such a way that high pressures up to at least 30 bar or more are assured in constant operation without damage. The selection of materials results firstly from the pressure with which the reactants are fed into the reactor, and secondly from the high operating temperatures.

In the context of the invention, a high pressure is defined as 10-50 bar, preferably 15-40, more preferably 20-35, especially about 30 bar, with variations values of in each case 20%, preferably 10%, more preferably 5%, especially 3%.

The reactor may have any desired outside shape, preferably as a cylinder or cuboid, optionally with rounded edges. The reactor has a fluid-tight and pressure-stable opening and optionally removable lid through which the individual elements or components of the reactor are accessible and removable.

In one embodiment of the present invention, the reactor has essentially the shape of a cylinder that optionally has an optionally cuboidal outside insulation. "Essentially the shape of a cylinder" means that the circular end faces of the cylinder may also have curvature and/or that these have a rounded edge at the outer face. It is likewise possible, in one alternative, for the outer face also to have curvature. In the boundary case, the essentially cylindrical shape may thus be a spheroid or ovoid.

In one alternative, the reactor consists of two half-shells. Proceeding from the model of the cylinder, any half-shell thus has a semicircle as end face. There is a corresponding change in the shape of the half-shell in the case of spheroids and ovoids. The two half-shells have fluid- and/or pressure-tight connection to one another, preferably screw connection. This enables opening of the reactor casing and hence of the reactor, which ensures easy maintenance and exchange of elements. The surrounded insulation is correspondingly likewise constructed from at least two parts, such that the two half-shells of the reactor can be opened.

In another alternative, the reactor of the invention has the shape of a cuboid. In this alternative too, the reactor may have been constructed from two correspondingly cuboidal shells. However, opening via a lid is also possible. In this embodiment, the lid extends essentially over an entire side face. Essentially in this case means that the lid covers at least 70-100%, preferably 80-100%, more preferably 90-100%, of the side face.

In a further embodiment, the reactor casing should therefore be openable such that all components of the reactor are accessible and individually exchangeable.

In one alternative, all connections, i.e. both inlets and outlets, are mounted on one side of the reactor.

Such a construction enables simple industrial maintenance.

The individual components and the reactor are closable in a fluid-tight manner such that the abovementioned high pressures in the interior are assured.

In the context of the invention, synthesis gas is a mixture containing or consisting of hydrogen and carbon monoxide, $H_2:CO$.

The product of the invention which is discharged from the reactor, in one embodiment, additionally contains $CO_2$ and/or water, optionally in the form of water vapor.

In one embodiment, the product of the invention which is discharged from the reactor is reformate gas or reformate comprising or consisting of hydrogen, carbon monoxide, carbon dioxide and/or water, optionally in the form of water vapor. Water, optionally in the form of water vapor, is removed at a later stage in one alternative.

In one alternative of the present invention, at least one of the two fluid reactants is a substance mixture. In a further alternative, the two fluid reactants are each substance mixtures.

Reactants used, i.e. starting materials, are fluids containing or consisting of hydrocarbons, preferably alkanes, alkenes and/or alcohols having C1-C10 carbon chains, especially methane, water, optionally in the form of water vapor, oxygen and/or air. The reactants may also contain further substances, for example higher hydrocarbons or cyclic compounds such as toluene, benzene and xylene, carbon dioxide $CO_2$ and nitrogen $N_2$. The hydrocarbons, preferably alkanes, alkenes and/or alcohols having C1-C10 carbon chains, especially methane, and higher hydrocarbons or cyclic compounds such as toluene, benzene and xylene are referred to as fuel.

According to the invention, the term "fluid" is used for gases and/or liquids.

In one alternative of the present invention, at least one of the two fluid reactants is a substance mixture. In a further alternative, the two fluid reactants are each substance mixtures.

Within the reactor shell, there is a mixer, a mixing space, a reaction space and inlets and outlets disposed in the reactor space. In one embodiment, the reactor shell may have insulations on the inside, i.e. within the reactor space, or on the outside.

"Axial" refers to the direction or arrangement parallel to the inlets, and "radial" as that perpendicular thereto.

The inlets are disposed between reactor shell and mixer and guide the reactants into the reactor; ultimately to the mixing space. In addition, an outlet for the synthesis gas as product leads from the reactor space outside through the reaction shell.

The at least two inlets for the at least two fluid reactants are arranged such that there is at least one fluid-tight inlet disposed within a further, i.e. outer, fluid-tight inlet. This especially relates to inlets within the reactor, i.e. in the reactor space between reactor shell and mixer.

In a further embodiment of the present invention, the inner inlet is longer than the outer inlet; the inner inlet therefore protrudes beyond the outer inlet.

In one embodiment, the inlets are a double tube, i.e. an outer tube having a greater diameter in which there is disposed at least one second tube having a smaller diameter, preferably in a concentric arrangement. It is thus assured that a reactant is guided in a fluid-tight manner, isolated from a second reactant within the outer tube to the mixer, and the at least second reactant is likewise fed to the mixer within the inner tube.

The reactor of the invention thus contains at least one mixer. The mixer contains, or consists of, a mixer base, at least one mixer disk for a first fluid, at least one mixer disk for a second fluid, a mixer closure and a lid.

In one embodiment, the mixer base has the shape of a disk with a concentric hole in the middle, through which the above-described inner inlet is guided, or the reactant in the inner inlet. The mixer base has further holes for the flow of the first reactant which is fed in from the outer inlet. The mixer base is thus placed onto the outer inlet such that the reactant from the outer inlet can flow axially only through the further holes. The two reactants are therefore still separated from one another, not yet mixed.

Downstream of the mixer base is disposed at least one first mixer disk. The latter likewise has a concentric hole in the middle for the passage of the inner inlet or the reactant in the inner inlet. The mixer disk further contains further holes analogously to the mixer base for the passage of the second reactant from the outer inlet. These holes for the reactant in the outer inlet are arranged identically in the mixer disk and mixer base and positioned for the flow of the reactants in the outer inlet without mixing with the reactant in the inner inlet. Offset from the holes for the reactant in the outer inlet, the first mixer disk has holes for the reactant in the inner inlet that are independent and separate from the concentric hole disposed in the middle. These holes for the reactant in the inner inlet are covered and closed by the mixer base. From these holes, channels/grooves—i.e. recesses in the side facing the mixer base—lead outward in the first mixer disk, preferably in a tangential manner, i.e. into the mixing space for release of the reactant in the inner inlet into the mixing space.

In one alternative, the first mixer disk, apart from the inner concentric hole, has twice as many holes as the mixer base, of which half are assigned to the reactant in the outer inlet and the other half to the reactant in the inner inlet.

After the first mixer disk, there is disposed at least one second mixer disk, provided with a concentric hole in the middle through which the above-described inner inlet is guided or the reactant in the inner inlet. This is identical to the first mixer disk, but in a mirror-image arrangement. It thus has channels/grooves on the side remote from the first mixer disk. These channels are also assigned to the holes for the reactant in the outer inlet. Therefore, the channels in the first mixer disk are arranged offset from those in the second mixer disk in order to prevent overlap of the channels. The channel outlets are thus in a plane, which leads to better mixing.

After the second mixer disk, there is disposed a mixer closure. This is identical to the mixer base, but the holes are in an offset arrangement compared to the holes in the mixer base for the reactant in the outer inlet. Thus, the holes are assigned to the inner inlet or to the reactant in the inner inlet. The mixer closure closes and hence also covers the holes in the second mixer disk and the corresponding channels for the reactants in the outer inlet.

Finally, after the mixer closure, there is disposed a mixer lid. This has channels, i.e. non-continuous holes, that lead from the center of the mixer disk outward but are closed off from the edge of the mixer lid. As a result, the reactant in the inner inlet is guided through the channels from the center of the lid outward. The mixer lid is arranged such that the channels form a common space with the holes in the mixer closure for the reactant in the inner inlet. This reverses the flow of the reactant at the mixer lid.

The mixer is mounted on the inner inlets for the reactants. In one variant, it is welded on.

In one embodiment of the present invention, for the construction of the mixer, all disks are bonded to one another and sealed with respect to one another. These are then pulled over and secured, preferably welded, on the protruding inlet. By virtue of this simple construction, securing, preferably welding, can be effected merely at the outer edge. This construction is subsequently concluded by the mixer lid.

In one embodiment, the mixer has a radially symmetric construction, especially comprising mixer base, any even number of mixer disks. And mixer closure.

The mixer base, the mixer disks and the mixer closure have a concentric hole in the middle for the flow of the reactant in the inner inlet. The reactant in the outer inlet flows through the corresponding holes in the mixer base of the first mixer disk and the second mixer disk. The holes in the second mixer disk for the reactant in the outer inlet are covered by the mixer closure, such that the reactant flows through the channels that are tangentially on the outside into the mixer space. The reactant in the inner inlet flows through the hole in the mixer base which is arranged concentrically in the middle, the two mixer disks and the mixer closure as far as the mixer lid. Here, there is a reversal of flow via the slots in the mixer lid, such that the reactant flows through the mixer closure, the second mixer disk and the first mixer disk as far as the mixer base, which covers the holes for these reactants in the first mixer disk. By virtue of the channels directed tangentially outward, the reactant likewise flows into the mixer space.

In a further embodiment, especially in the case of relatively large mixers with relatively high total throughput, the mixer disks are arranged in alternate, successive repetition, such that mixing across the entire mixing space is assured and the flow rate in the exit channels preferably does not exceed 50 m/s.

According to the invention, the above-described holes and disks are openings and disk-shaped components in the broadest sense, i.e. not necessarily circular openings and components; instead, the openings and components may have any desired shape (i.e. cross section).

In one embodiment, the cross section of the inlets and the mixer is circular. In one alternative, the cross section may, however, also have an oval or rectangular or tetragonal form, optionally with rounded edges.

Materials employed for the reactor or the reactor shell include metal alloys, especially stainless steel, preferably iron-chromium alloys and nickel-chromium alloys (FeCr alloy, Nicrofer, Crofer).

Suitable materials for the mixer and the corresponding components are likewise metal alloys, stainless steel, preferably iron-chromium alloys and nickel-chromium alloys.

The reactor is constructed such that the mixing space is at the opposite end from the entry of the inlets for the reactants and from the discharge of the synthesis gas through the reactor shell.

In one embodiment, the mixing space is at least partly filled with ceramic foam or powder. The fluid mixture formed in the mixing space is deflected in the optionally insulated reactor shell in the direction of the opposite end (at which the inlets and outlets pass to the reactor shell). In one embodiment, the fluid mixture flows through the ceramic foam.

In a preferred embodiment, the space between mixer, preferably microscale mixer, and first heat shield is filled with a ceramic, porous material. This can prevent a homogeneous reaction. The filling material, preferably with fine pores and having a high flow resistance, acts as a flame barrier and optionally as a heat shield. This results in a homogeneous distribution of the mixture of the reactants downstream of the mixer.

In one embodiment, the reactor has a heat shield composed of at least one monolithic body. In one alternative, it comprises or consists of at least one monolith composed of the following materials: mixed Al—Si oxides, cordierite, $ZrO_2$ or high-temperature steels. Arranged around the inlet, such that the fluid mixture penetrates the heat shield in countercurrent with regard to the inlets. Optionally, ceramic foam or powder is likewise disposed between the mixing space and the heat shield.

In one alternative, the monolith is a ceramic foam.

In one alternative, the heat shield is formed from multiple monoliths that form a layer around the inlets.

This heat shield is followed by the reaction space of the reactor.

The reaction space is likewise formed from at least one monolith. This monolith is a catalyst-functionalized monolith; in other words, in one embodiment, the monolith comprises or consists of the following materials: mixed Al—Si oxides, cordierite, $ZrO_2$ or high-temperature steels.

In one alternative, the term "monolith" also includes other (micro)structured bodies or packing of catalyst powder.

In a further embodiment, the reaction space that follows the heat shield is formed from multiple monoliths.

The monolith(s) of the reaction space have a porous structure with a cell density of 200 to 1000 cpsi, preferably 250 to 800, more preferably 200 to 700, 350 to 650, especially 400 to 600. The monolith(s) have been functionalized with catalyst, meaning that there is at least one catalyst for the catalysis of the formation of synthesis gas in the pores.

Catalysts used are catalysts containing precious metals, preferably rhodium and/or nickel. In one alternative, support materials are used in order to increase the surface area for the active material Ni, Rh. The support material here (typically Al2O3) is applied to the monolith by standard methods such as sol-gel methodology, wash-coating or the like, or alternatively to a body coated in some other way, for example a microstructured system.

In one alternative, the catalyst present in the reaction space, i.e. in the pores of the monolith, shows a concentration gradient. The concentration in the catalyst per unit volume of monolith or cell can vary axially or radially.

In one variant, the reaction space or the functionalized monolith contains different regions, i.e. segments having different concentration of catalyst. In another alternative, the reaction space contains segments having different catalysts. In a further alternative, there is a combination of different catalysts and different concentrations.

The abovementioned regions or segments may also be individual monoliths. It is essential that the reaction space is formed by monoliths as a layer around the inlet for the reactants.

In one alternative, any layer of monoliths, i.e. any individual monolithic zone, may also be configured as one or more layers of monoliths. A single layer may in turn consist of multiple segments.

A monolithic zone means any zone in the reactor constructed from monoliths, preferably the reaction space; but in one variant additionally the at least one heat shield.

The individual segments may have different structures, especially pore sizes or set sizes and walls.

The reaction space, for example, may thus consist of multiple layers of multiple segments composed of monoliths. The individual segments may have different cell and wall structures and/or dimensions, and/or have been filled or charged with different catalysts. The segment structure or layer structure of the individual layers, such as heat shield and reaction space, allows the conduction of heat to be controlled specifically in axial direction or vertical direction with respect thereto, i.e. radial direction. The flow of the reactants can likewise be controlled. In the reaction space, the individual segments and layers can be arranged in series such that, with regard to the catalyst, a gradient is constructed and/or different catalysts can be used.

A layer may be constructed from multiple sheets. A layer is therefore not necessarily defined by segments of monoliths, but primarily by the mode of function of the monoliths, although these can define particular structures.

In one embodiment of the invention, the reaction space is followed by a second heat shield formed from at least one monolith. In one alternative, the term "monolith" here also includes other (micro)structured bodies or packing of catalyst powder.

After the reaction space, optionally after the second heat shield, there is disposed the discharge of the synthesis gas. This is at the same and/or on the same side of the reactor as the inlet for the reactants. In one alternative, the synthesis gas is discharged from a cavity that follows the reaction space or the second heat shield.

The reactor of the invention offers the following advantages:

The inventive construction of the reactor has been found to be particularly advantageous for the maintenance and exchange of individual components. By opening the reactor, any individual element in the reactor is easily accessible. Individual components, for example mixer, heat shield reactor, but also individual elements, for example monolithic segments, can be exchanged easily.

The reactor construction preferably assures an extremely small dead volume.

In addition, it constitutes a very compact reaction unit, smaller by at least a factor of 10 than the reactors known from the prior art with the same conversion. Therefore, the reactor is ideally usable in mobile turnkey container- or skid-based plants.

In addition, the reactor of the invention achieves high process intensification, meaning that it is possible to control and monitor reactions at high pressure in a small space.

The use of the mixer of the invention additionally increases reactor safety since the individual reactants are only combined here. No exothermic reaction with high temperature peaks is thus possible beforehand.

The mixer of the invention is also producible in a simple manner and meets high safety standards.

Owing to the preferably tangential flow of the fluids from the mixer through the grooves provided, rapid mixing is achieved. Moreover, this prevents backward diffusion and unwanted ignition through the channels, especially in the event of emergency shutdown.

Moreover, the countercurrent construction prevents the occurrence of axial thermodynamic stress as a result of the different materials. The countercurrent construction results in only a small rise in temperature of the reactants as they pass through the inlets. The thermal shielding of the inner inlet from the heat of reaction from the reaction space is particularly advantageous here with respect to coking processes, especially if hydrocarbonaceous reactants are being passed through. This means that the reactor has long-term stability.

The first heat shield upstream of the reaction space results in temperatures outside the monolithic bodies of the reaction space that are below the critical values for homogeneous reactions. In the case of a preferred adiabatic reaction regime in radial and/or axial direction, the temperature is even lowered below the critical values.

The axial conduction of heat in the monolithic structures, heat shield and reaction space allows controlled axial transport of heat, such that no preheating to reaction temperature is necessary. At the same time, the temperature maximum is attenuated. The monolithic structure reduces heat transport through radiation.

Moreover, the heat of reaction by virtue of the temperature differential between inlet and outlet temperature can be utilized in an external heat exchanger.

By virtue of the series connection to one or more heat exchangers, it is additionally possible to control the input conditions and hence also the output conditions and the temperature peaks in the monolithic zone.

Owing to the connection and the reactor construction, load-flexible regulation of the process is controllable.

The use of different catalysts or catalyst concentrations additionally makes it possible to control the reaction rate and hence the temperature peak.

The reactor of the invention may be configured as a transportable plant, especially as a SKID-based system.

In a further embodiment, the reactors of the invention are in modular design, meaning that at least two or more reactors are connected in parallel. This gives rise to additional options for better adjustment of load.

Owing to the separate inlets for the reactants and the small changes in temperature in these inlets, it is possible to implement special designs or connections to one or more heat exchangers for products with reactants that lead to an increase in load flexibility.

The reactor of the invention, optionally connected to one or more heat exchangers, has a load flexibility of 30-100%. It is thus possible to operate the reactor at low flow as well, at up to 30% of nominal load (100%). This is especially important in the case of use of biogas, for example, the composition of which is seasonally different, or in the case of use of accompanying gas in the case of mineral oil wells, which decreases continuously with the operation of the mineral oil well.

Connection to heat exchangers can achieve synergistic effects since some of the heat from the product is transferred into the reactor, especially for preheating of the reactants. Since CPOX proceeds exothermically, no additional heat must or should be fed into the reaction space.

In one embodiment of the present invention, the reactor of the invention thus has fluid-tight connection to a heat exchanger.

The heat exchanger has at least two inlets for a fluid cooling medium and at least one inlet and one outlet for the fluid product from the reactor.

In a further alternative, the heat exchanger has two chambers of different size or two chambers with different cooling area.

In one alternative, the reactor is configured as a two-stage cross-heat exchanger. In another alternative, for example, two countercurrent or cocurrent heat exchangers may also be connected to form a single heat exchanger.

In a further alternative, the heat exchanger is configured as a microstructured heat exchanger.

In addition, the heat exchanger has an on/off controller which, in one alternative, is assured by means of a valve.

The division of cooling area within the heat exchanger or the two separate chambers relative to one another is preferably in a ratio of 4:1 or 3:1, preferably 2:1.

For switching between the two cooling area regions, in one alternative, it is possible to utilize two valves.

The at least two inlets are configured such that one inlet in each case is assigned to at least one chamber or one cooling area of the heat exchanger and guides the cooling medium into the corresponding region.

The reaction product from the reactor of the invention can be guided in a fluid-tight manner within the heat exchanger and be cooled by means of the cooling medium. The cooling medium heated in the heat exchanger can optionally be passed into the reactor as a preheated reactant.

The reactor of the invention and optionally the heat exchanger of the invention are used for production of synthesis gas.

The present invention also provides a process for producing synthesis gas, in which the reactor of the invention is used.

In a preferred embodiment, the synthesis is effected under high pressure.

The process is characterized in that a fluid reactant is first fed to the mixer in an inner inlet in cocurrent with a further fluid reactant in the outer inlet.

The fluid reactant in the outer inlet is passed through a first mixer disk and guided into the mixer space preferably tangentially via channels in a further mixer disk, while the second fluid reactant in the inner inlet, after an internal reversal of flow in the mixer lid, is guided preferably tangentially into the mixer space through the further, second mixer disk via channels in the first mixer disk. The naming of the first and second and any further mixer disks is in the sequence in the flow direction of the reactants in the inlets.

In a further step, the two reactants are guided out of the mixer space, in countercurrent with respect to the inlet for the reactants upstream of the mixer space, through a first heat shield to the reaction space.

The product formed therein is likewise guided in countercurrent to the inlet for the reactants, optionally through a further heat shield, for discharge from the reactor.

In one alternative, it is led off from the reaction space without flowing through a heat shield.

In one embodiment, the product thus formed can be guided into the above-described heat exchanger and cooled therein by means of a fluid medium.

In a preferred embodiment, a mixture of fuel and water vapor is fed into the reactor as the first reactant. In one alternative, this is effected in the inner inlet.

In the other, separate inlet, air is introduced as the second fluid reactant, preferably air that has been heated beforehand as cooling medium in the heat exchanger. In one alternative, air is fed in the outer inlet.

In a further embodiment of the invention, for cooling of the product volume, a further inlet to the heat exchanger, thus corresponding to the outlet of the product, may be connected in order thus to adjust the cooling area to the amount of product.

In one alternative, the fuel used is methane-containing gas. This consists essentially of methane, but may also contain further higher hydrocarbons, i.e. alkanes and alkenes with C2-C10 carbons, and aromatic hydrocarbons, alkyl-substituted aromatic hydrocarbons, especially benzene, toluene and xylene, and any combination of these substances.

Steam is added to the methane-containing gas, and it is guided via one of the two inlets in the reactor, preferably the inner inlet, into the mixing space. In cocurrent to this, the further reactant, the oxidizing agent, is fed in, preferably in the outer inlet. Advantageously in accordance with the invention, air is used and not pure oxygen. This reduces the complexity involved in the provision of the reactants.

The inlet flow rate is at least 1 m/s, preferably 5-30 m/s, particularly 5-10 m/s.

In one alternative, the reactants are mixed in such a way that 5-60% by volume of steam is present in the reaction mixture, based on methane in the mixing space, preferably 10-50%, more preferably 15-25% by volume. This proportion of steam lowers the reaction rate of the total oxidation and simultaneously controls the temperature differential relative to the temperature peak.

Owing to stability of catalyst and monolith materials, the temperature in the reaction space should not exceed 1000° C.; it is preferably 800-900° C.

The process can additionally be controlled in that a CO2 content of 5-60% by volume, preferably 10-50% by volume, more preferably 25-40% by volume, is present in the mixture of the reactants.

This increases the proportion of synthesis gas in the stoichiometry of H2:CO of 2:1 in the product gas and the efficiency of the conversion of CH4 or related fuels to CO. At the same time, the temperature peak at the catalyst is thus controlled.

In general, the concentration numbers given here relate to the substance mixture of CH4, CO2, H2O and O2, since partial oxidation is possible both with pure oxygen or with air; the nitrogen as ballast present in the air is not included here in the calculation.

Advantageously in accordance with the invention, at least one of the two reactants contains CO2, preferably both. The presence of CO2 in the reaction mixture, owing to the shift in equilibrium, results in complete oxidation of the fuel up to CO2 only to a very small degree. With regard to the utilization of carbon, this achieves a distinct improvement in the overall assessment than when $CO_2$-free reactants are used. More particularly, no separation of $CO_2$ prior to the reaction is required in the CPOX.

The residence time over the catalyst in the reaction region is 1-500 ms, preferably 2-100 ms, more preferably 5-20 ms.

The flow rate is at least 0.25 m/s, preferably 0.25-2 m/s, more preferably 0.4 to 0.8 m/s, especially 0.6 m/s. The values are normalized to 0° C. and standard pressure and the total cross section of the monolith body—optionally with subtraction of the volume of the other structured bodies—i.e. taking account of the increase in flow rate resulting from the wall thickness of the individual channels.

As a result of the relatively high flow rate, the position of the temperature peak and the rise in the temperature on entry into the reaction space is reduced, in order to avoid upstream homogeneous reaction at a pressure of up to about 30 bar.

In one embodiment, the temperature peak in the reactor is 500-1000° C., preferably 700-900° C., more preferably 750-800° C. From a temperature of about 500° C., the mixture can self-ignite. It is possible to use the air as oxidizing agent as a preheated air stream from the heat exchanger and feed it under pressure at a temperature of 250-600° C., preferably 450-550° C., more preferably 350-500° C., to the mixing space of the reactor. Thus, even in the case of any reduction to up to 30% of the nominal load, a mixing temperature in the mixing space of fuel, water vapor and air of 200-400° C., preferably 250-350° C., can be achieved.

The reactor of the invention can be used in the mineral oil and natural gas industry. In the case of excessively long transport routes or excessively small amounts of accompanying or refinery gas that have to be flared off in order to reduce greenhouse gas potential, it is possible to use the reactor of the invention. In addition, it can also be used in conjunction with combined heat and power plants.

The reactor of the invention is also used with biogas as fuel. Depending on the market price of power or natural gas, converting biogas to power or feeding in biogas is only viable to a very limited degree. Through the use of biogas as fuel in the reactor and process of the invention, it is possible to utilize it more efficiently.

In addition, the reactor of the invention can be used for production of small amounts of synthesis gas or hydrogen for industrial purposes. Mention should be made here by way of example of Fischer-Tropsch synthesis, generation of synthesis gas or hydrogen from liquid hydrocarbons.

BRIEF DESCRIPTION OF THE DRAWINGS

In the accompanying drawings.

DETAILED DESCRIPTION OF EMBODIMENTS OF THE INVENTION

Figure 1:
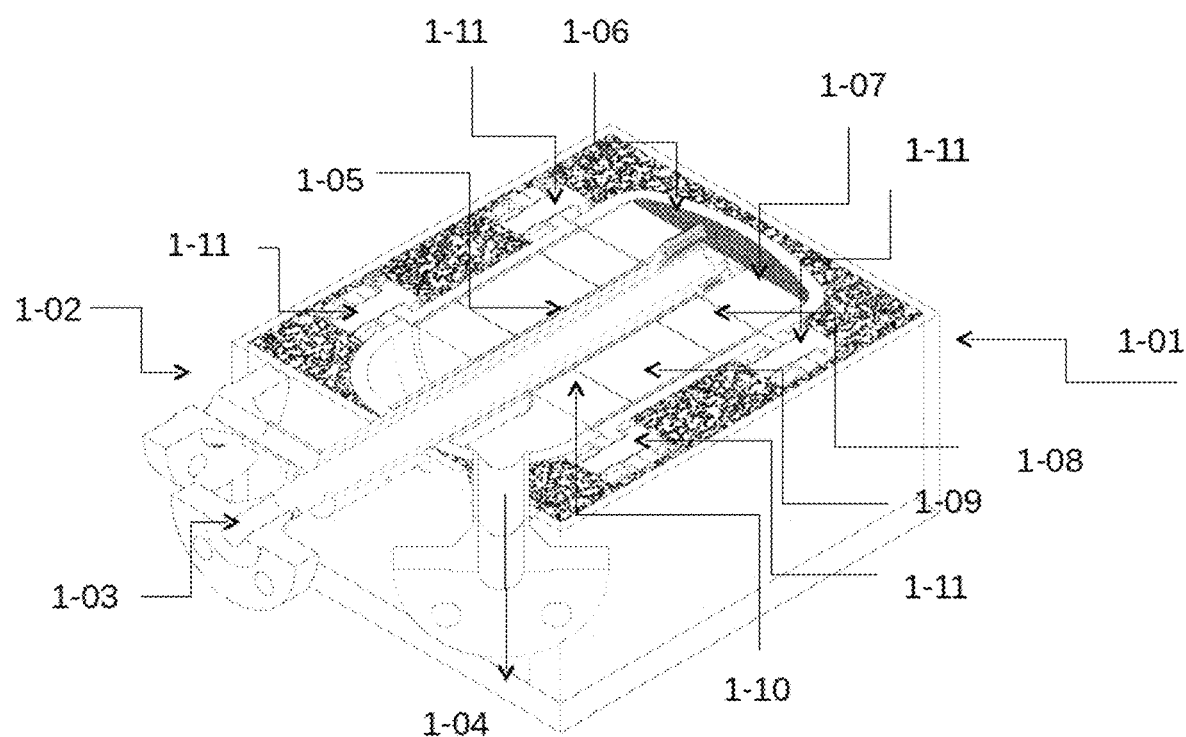
FIG. 1 shows a cross-section of an embodiment of a reactor according to the invention.

In one embodiment, the reactor of the invention and the heat exchanger of the invention are used in the process of the invention for production of synthesis gas as follows:

The reactor (1-01) is shown in FIG. 1: what is shown is the reactor housing in cross section.

The screws (1-11) are released for disassembly and the reactor shell and reactor are opened. What is clearly apparent is the easy accessibility of the individual elements of the reactor. The stable design allows operation under high pressure, preferably at about 30 bar.

For the production of synthesis gas, air is preferably fed into the outer inlet (1-02) of the two concentric inlets, preferably in the form of a double tube.

Figure 2:
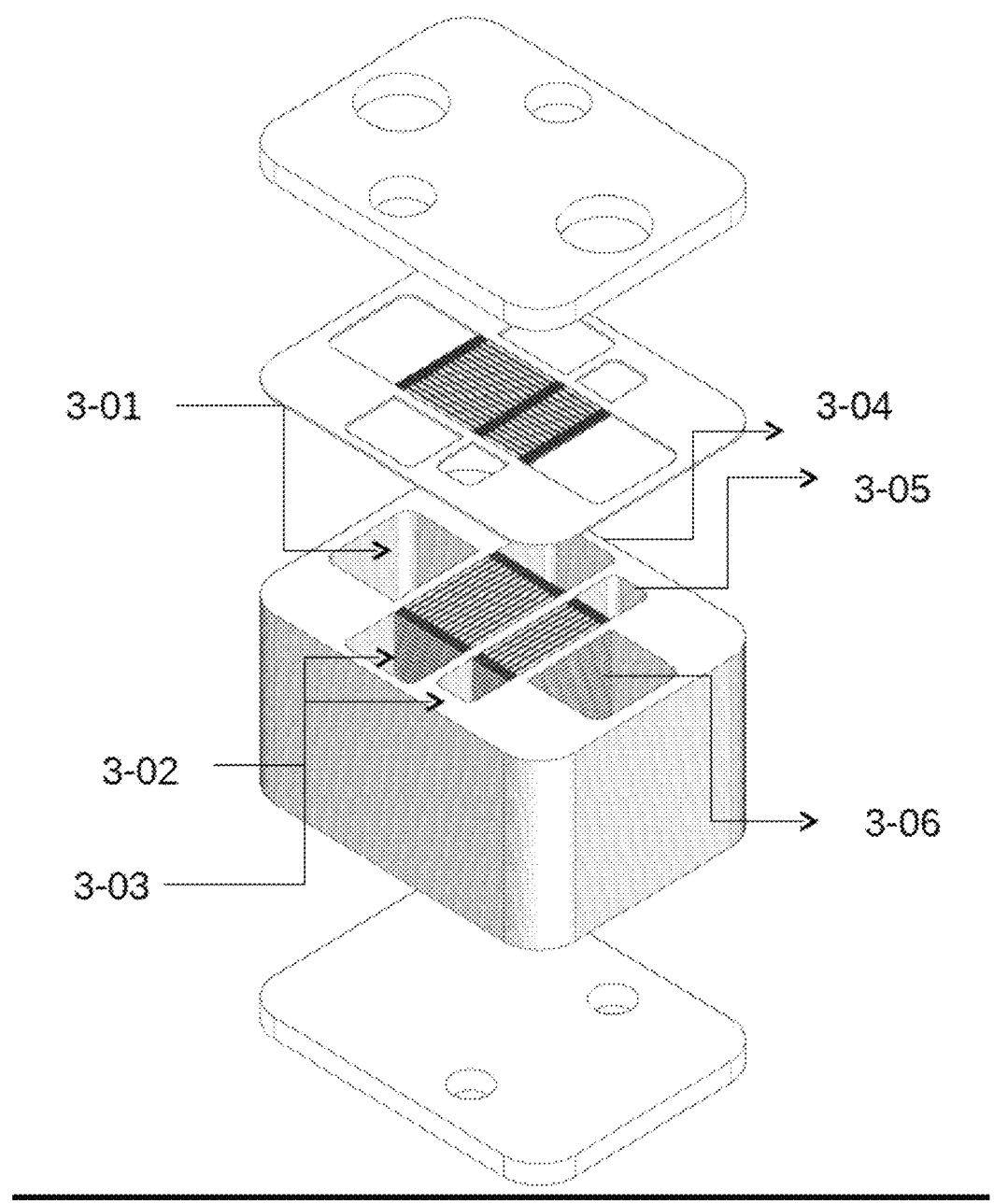
FIG. 2 shows a mixer of a reactor of the invention.

The second reactant, preferably a fuel, preferably comprising CH4 mixed with water vapor, is fed into the inner inlet (1-03). The water vapor is preferably generated externally, but may also be in the form of an aerosol in the gas or be atomized in the mixer. The two concentric inlets (1-05) convey the two reactants in axial direction to the mixer (1-06). The mixer is shown in FIG. 2. The mixer consists of a mixer base which is preferably in the form of a disk, such that the inner inlet (2-03=1-03) is conducted through the opening of the disk. The mixer base (2-02) closes the outer inlet (2-01=1-02) and has multiple holes for the flow of the reactant in the outer inlet, preferably air. The mixer base is followed by a mixer disk (2-04) with the corresponding channels for the reactant in the inner inlet, preferably gas and water vapor, to exit the mixer. This disk has holes through which the reactant in the outer inlet, preferably the air, can flow.

This is followed by a further disk (2-05) provided with the channels that allow the reactant in the outer inlet, preferably air, to exit the mixer. The disks (2-04) and (2-05) that allow the reactants to exit the mixer can be inserted as often as desired, as shown in FIG. 2. The last disk that allows the reactants to exit the mixer in the outer inlet follows the mixer closure (2-06). This has holes for the passage of the reactant in the inner inlet, preferably gas and water vapor.

As described above, the elements mixer base (2-02) and disks (2-04 and 2-05) that allow the reactants to exit the mixer, in any number, and the mixer closure (2-06) are connected to one another in a fluid-tight manner, such that the reactants can flow through the corresponding holes. These disks are preferably welded to one another and placed onto and secured, preferably welded, to the inner inlet, preferably the inner tube in the double tube.

As its last element, the mixer has the mixer lid (2-7) which is responsible for deflection of flow of the reactant in the inner inlet.

The mixer exits for the reactants are offset, such that good mixing in the mixer space (1-07) is assured.

The mixer space preferably has an optional partial filling with a ceramic foam or powder.

Outside the inlet, the mixture of the reactants is guided through the heat shield (1-08) in countercurrent to the reaction space (1-09).

After the reaction, the product, preferably reformate, is further guided in countercurrent with respect to the inlet through a further heat shield (1-10) for discharge (1-04).

Figure 3:
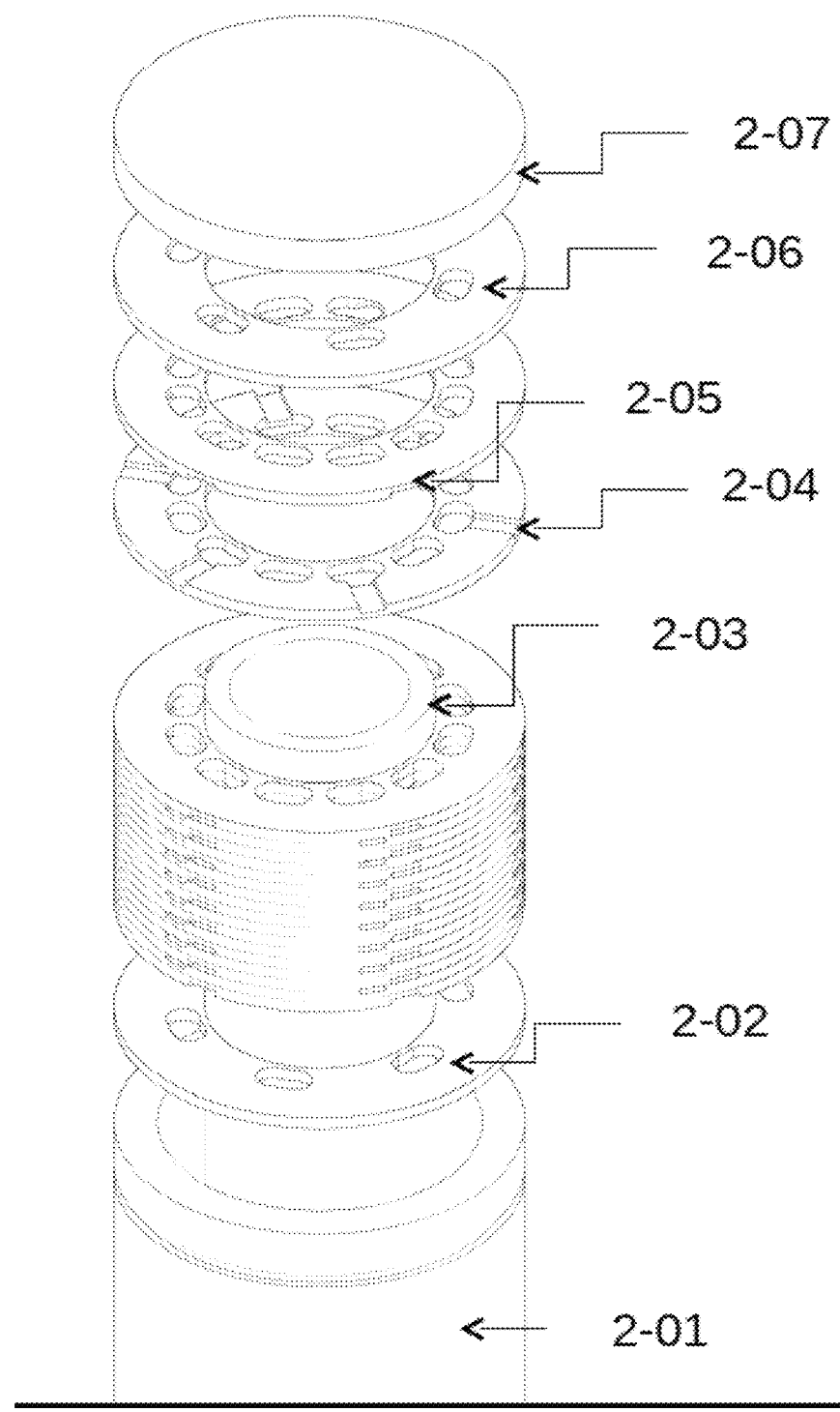
FIG. 3 shows a heat-exchanger for a reactor of the invention.

In one embodiment of the invention, the product is guided into a heat exchanger. An alternative for the heat exchanger is shown in FIG. 3. The product is guided into the heat exchanger via the inlet (3-01). Cooling medium, preferably air, is guided via the inlets 1 and/or 2 (3-02 and/or 3-03), into the heat exchanger. The heated cooling medium is led off via the outlets 1 and 2 (3-04 and/or 3-05), while the cooled product, preferably reformate, is passed on via outlet (3-06).

Figure 4:
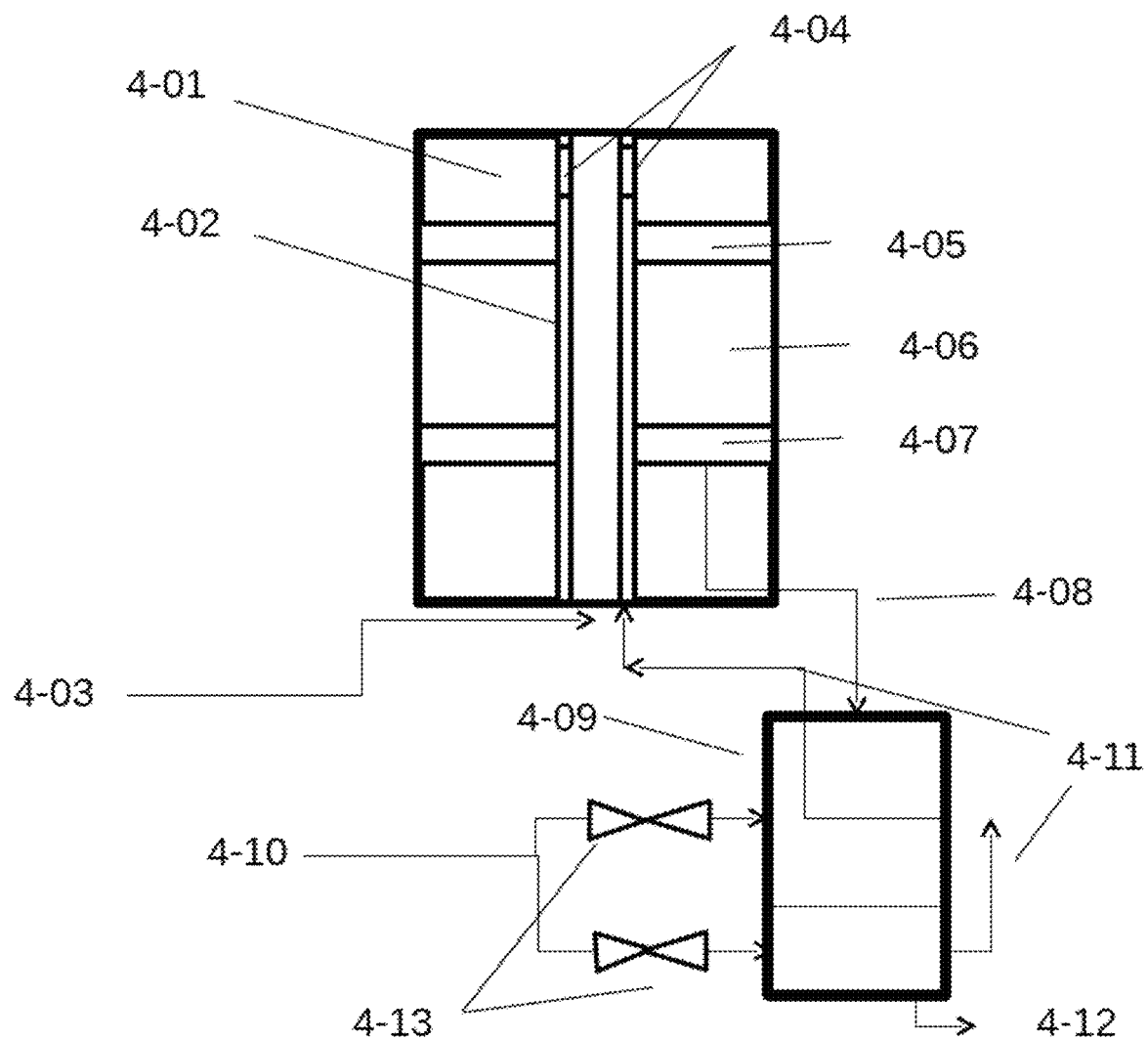
FIG. 4 shows schematically a reactor of the invention with heat exchanger.

A preferred construction of the reactor of the invention with heat exchanger of the invention is shown in schematic form in FIG. 4. Synergistic effects can be achieved in that the heated cooling medium (4-11), preferably air, is guided as reactant into the reactor, preferably the outer inlet.

EXAMPLES

For the experiments, a reactor with a first heat shield, a reaction space with 2 monoliths having identical catalysts (commercial) in series, a second heat shield was used.

Monoliths for the heat shields and in the reaction space made of cordierite.

Experimental Conditions

|  | Experiment | | | |
| --- | --- | --- | --- | --- |
|  | 1 | 2 | 3 | 4 |
| $x_i$ [%] CH4, CO2, O2, N2, H2O | 17.24; 11.50; 10.77; 43.25; 17.24 | 17.24; 11.50; 10.77; 43.25; 17.24 | 16.67; 11.11; 11.11; 44.44; 16.67 | 17.24; 11.50; 10.77; 43.25; 17.24 |
| v [m/s] at 0° C. and 1.013 bar | 0.52 | 0.42 | 0.43 | 0.52 |
| p [bar] | 30 | 20 | 20 | 1 |
| $T_{in}$ [° C.] | about 340 | about 340 | about 340 | about 320 |
| $T_{max}$ [° C.] | 834 | 832 | 865 | 800 |
| $X_{CH4}$ [%] | 79 | 79 | 83 | 88 |
| $S_{H2}$ [%] | 83 | 79 | 81 | 92 |
| $S_{CO}$ [%] | 81 | 72 | 77 | 81 |

Xi: proportions of the reactants in the mixer space in %
v: flow rate
p: pressure in inlets or reactor
Tin: temperature of the reactants in inlet
Tmax: maximum temperature in the reactor/reactor space
X(CH4): CH4 conversion
S(H2): selectivity for hydrogen
S(CO): selectivity for carbon monoxide

LEGEND

The figures are merely a schematic representation; the size ratios may vary.

1-01—reactor
1-02—outer inlet for fluid reactant, preferably air
1-03—inner inlet for fluid reactant, preferably gas+steam
1-04—outlet for product, preferably synthesis gas (reformate)
1-05—concentric inlets, preferably double tube
1-06—mixer
1-07—mixer space, preferably filling with ceramic foam
1-08—heat shield (monolith)
1-09—reaction space, functionalized monolithic (catalyst)
1-10—heat shield (monolith)
1-11—screws for opening and closing the reactor and the reactor shell
2-01—outer inlet, preferably outer tube
2-02—mixer base with passage for reactant in outer inlet, preferably air
2-03—inner inlet, preferably inner tube
2-04—disk allowing reactant in the inner inlet, preferably gas+steam, to exit mixer
2-05—disk allowing reactant in the outer inlet, preferably air, to exit mixer
2-06—mixer closure with passage of reactant in the inner outlet, preferably gas+steam
2-07—mixer lid with deflection of flow for reactant in the inner inlet, preferably gas+steam
3-01—inlet for product from reactor, preferably synthesis gas (reformate)
3-02—inlet 1 for cooling medium, preferably air
3-03—inlet 2 for cooling medium, preferably air
3-04—outlet 1 for heated cooling medium, preferably air
3-05—outlet 2 for heated cooling medium, preferably air
3-06—outlet for cooled product, preferably synthesis gas (reformate)
4-01—reactor=1-01
4-02—inner and outer inlet, preferably in the form of a double tube
4-03—reactant in inner inlet, preferably gas+steam
4-04—mixer=1-06
4-05—heat shield=1-08
4-06—reaction space, functionalized monolith (catalyst)=1-09
4-07—heat shield=1-10
4-08—product, preferably synthesis gas (reformate)=1-04
4-09—heat exchanger
4-10—cooling medium, preferably air,=3-03 and/or 3-04
4-11—heated cooling medium, preferably air, 3-04 and/or 3-05 and 1-02
4-12—cooled product, preferably synthesis gas (reformate)
4-13—valves

What is claimed is:

1. A reactor for the preparation of synthesis gas, wherein the reactor comprises a mixer, a mixing space, a reactor space, separate inlets for at least two fluid reactants and an outlet for at least one fluid product, and a reactor shell surrounding these, and wherein the mixer comprises a mixer base, at least one mixer disk with channels for a first fluid, at least one mixer disk with channels for a second fluid, a mixer closure, and a mixer lid and the reactor comprises
an outer fluid-tight inlet for at least one reactant between reactor shell and mixer inside the reactor, within which there is disposed at least one fluid-tight inlet for a further reactant,
and
a countercurrent construction with regard to a flow of the reactants in the inlet between the mixing space and the outlet.

2. The reactor of claim 1, wherein the separate inlets are a concentric double tube.

3. The reactor of claim 1, wherein the mixer has a fluid-tight connection to the separate inlets.

4. The reactor of claim 1, wherein the reactor further comprises at least one catalyst-functionalized monolithic body.

5. The reactor of claim 1, wherein the reactor further comprises at least one heat shield of at least one monolithic body.

6. The reactor of claim 1, wherein the reactor further comprises at least one catalyst-functionalized monolithic body and/or at least one heat shield of at least one monolithic body and wherein the at least one catalyst-functionalized monolithic body and/or the heat shield of at least one monolithic body are each arranged as a ply/layer around the separate inlets within the reactor shell.

7. The reactor of claim 1, wherein the reactor is connected in a fluid-tight manner to a heat exchanger.

8. The reactor of claim 7, wherein the heat exchanger comprises at least two inlets for a fluid cooling medium and at least one inlet and one outlet for the fluid product from the reactor.

9. The reactor of claim 7, wherein the heat exchanger comprises at least two chambers of different size.

10. A process for the production of synthesis gas, wherein the method comprises making the synthesis gas by using the reactor of claim 1.

11. The process of claim 10, wherein synthesis gas is produced under high pressure.

12. The process of claim 10, wherein a first fluid reactant is guided into a mixing chamber through openings in a first mixer disk via channels for the first fluid in a second mixer disk, and a second fluid reactant, after an internal reversal of flow in the mixer lid, is guided into the mixing space through openings in the second mixer disk via channels for a second medium in the first mixer disk.

13. The process of claim 10, wherein reactants are guided into the mixer in a separate flow regime in two concentric inlets, and then guided as a mixture in countercurrent through a first heat shield to a reaction space, and a product formed therein is likewise guided in countercurrent to a feeding of the reactants to discharge the product.

14. The process of claim 13, wherein the product thus formed is guided into a heat exchanger.

15. The process of claim 14, wherein in the heat exchanger the product is cooled in crosscurrent with a fluid medium.

16. The process of claim 10, wherein in an inlet to the reactor a mixture of fuel and water vapor is introduced as a first reactant and, in another separate inlet air is introduced as a second fluid reactant.

17. The process of claim 16, wherein the mixture of fuel and water vapor is introduced in an inner inlet and air is introduced in an outer inlet.

18. The process of claim 16, wherein the air has been heated beforehand as cooling medium in a heat exchanger.

19. The process of claim 16, wherein a cooling surface of a heat exchanger for formed product is adapted to an amount of product by opening up at least one further inlet.

* * * * *